US005372253A

United States Patent [19]

O'Brien et al.

[11] Patent Number: 5,372,253
[45] Date of Patent: Dec. 13, 1994

[54] HOLDER/END CAP FOR STORAGE PACKAGE

[75] Inventors: Patrick J. O'Brien, Hackensack; Herbert Friedman, Fort Lee, both of N.J.

[73] Assignee: Ivy Hill Corporation, New York, N.Y.

[21] Appl. No.: 983,634

[22] Filed: Dec. 1, 1992

Related U.S. Application Data

[63] Continuation of Ser. No. 817,897, Jan. 8, 1992, Pat. No. 5,188,230, which is a continuation-in-part of Ser. No. 807,477, Dec. 12, 1991, Pat. No. 5,219,417, which is a continuation-in-part of Ser. No. 698,201, May 10, 1991, Pat. No. 5,205,405.

[51] Int. Cl.⁵ .................................................. B65D 85/57
[52] U.S. Cl. ................................... 206/312; 206/310; 206/444
[58] Field of Search ................... 206/309–313, 206/444

[56] References Cited

U.S. PATENT DOCUMENTS

| | | | |
|---|---|---|---|
| 4,623,062 | 11/1986 | Chase et al. | 206/311 |
| 4,702,369 | 10/1987 | Philosophe | 206/312 |
| 4,793,480 | 12/1988 | Gelardi et al. | 206/312 |
| 4,867,302 | 9/1989 | Takahashi | 206/312 X |
| 4,903,829 | 2/1990 | Clemens | 206/310 |
| 5,188,230 | 2/1993 | O'Brien et al. | 206/312 |

Primary Examiner—Bryon P. Gehman
Attorney, Agent, or Firm—Amster, Rothstein & Ebenstein

[57] ABSTRACT

A storage package for compact discs and the like has a plurality of non-plastic panels including a pair of end panels and optionally at least one panel intermediate to and connecting the pair of end panels. The plurality of panels is movable between an open orientation enabling access to the contents of the package and a collapsed orientation for storage purposes, each of the panels having a pair of opposed lateral sidewalls, and the plurality of panels in the collapsed orientation defining at least one spine. A holder formed of plastic is disposed on one of the panels for receiving and maintaining a compact disc thereon. An end cap is disposed on one of the end panels or pivotally on the holder, the end cap being adapted to releasably engage the holder when the plurality of panels is in the collapsed orientation, thereby to preclude accidental movement of the plurality of panels out of the collapsed orientation.

16 Claims, 13 Drawing Sheets

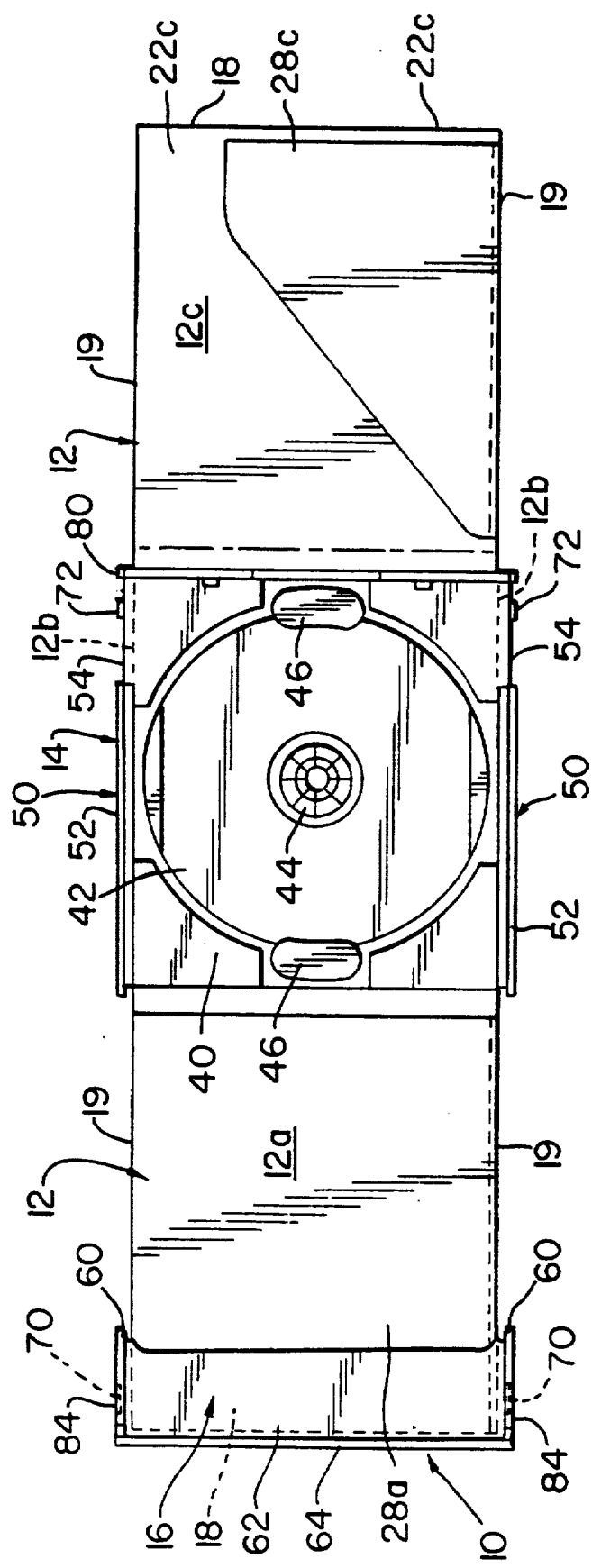

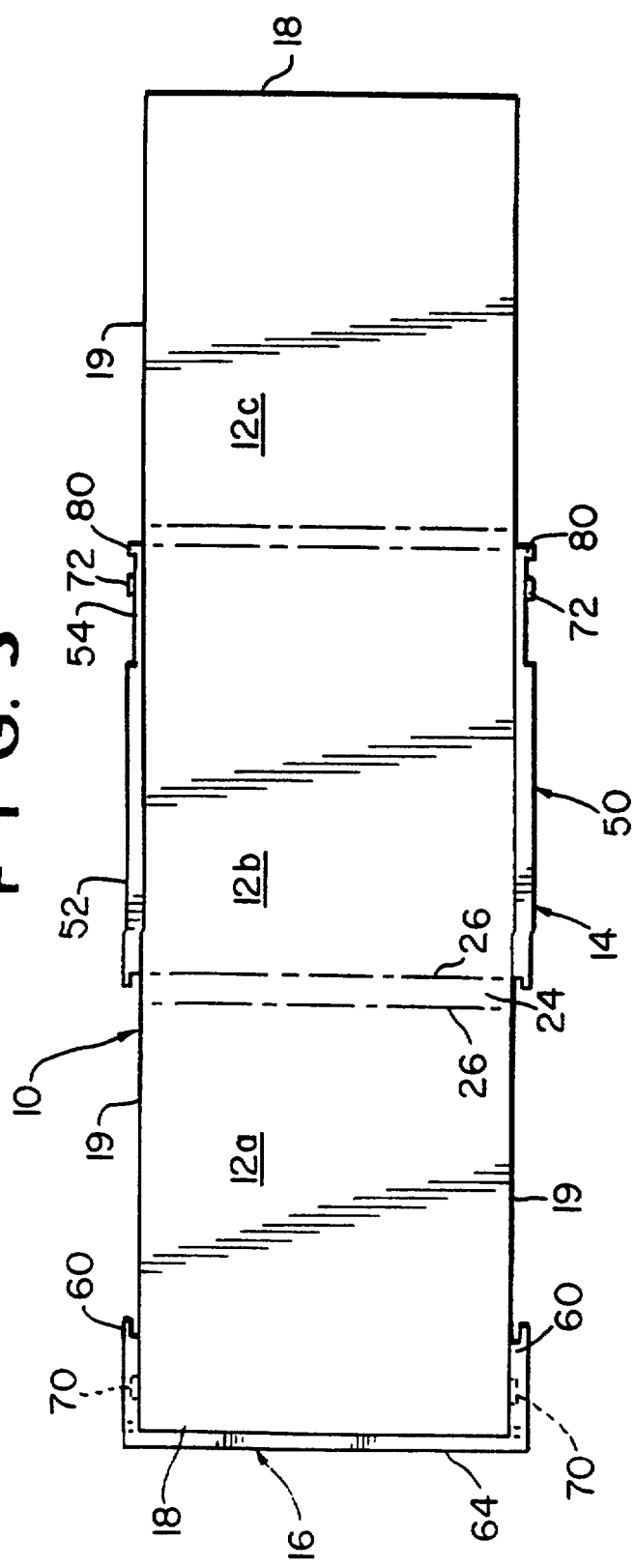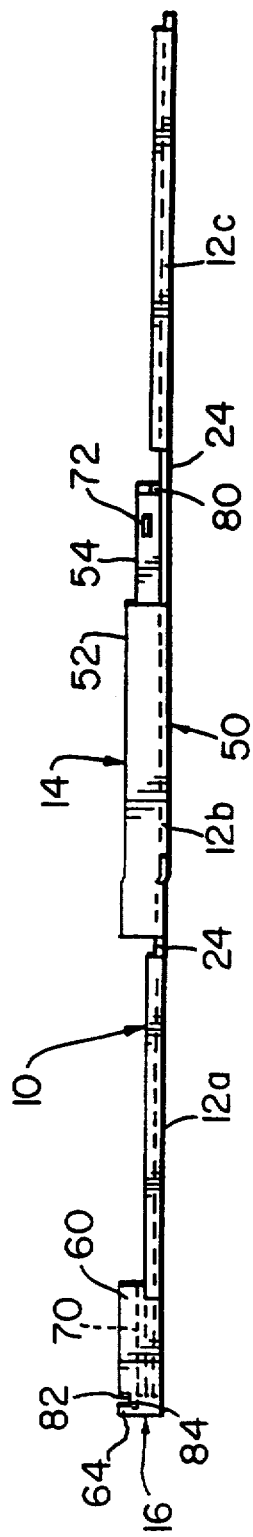

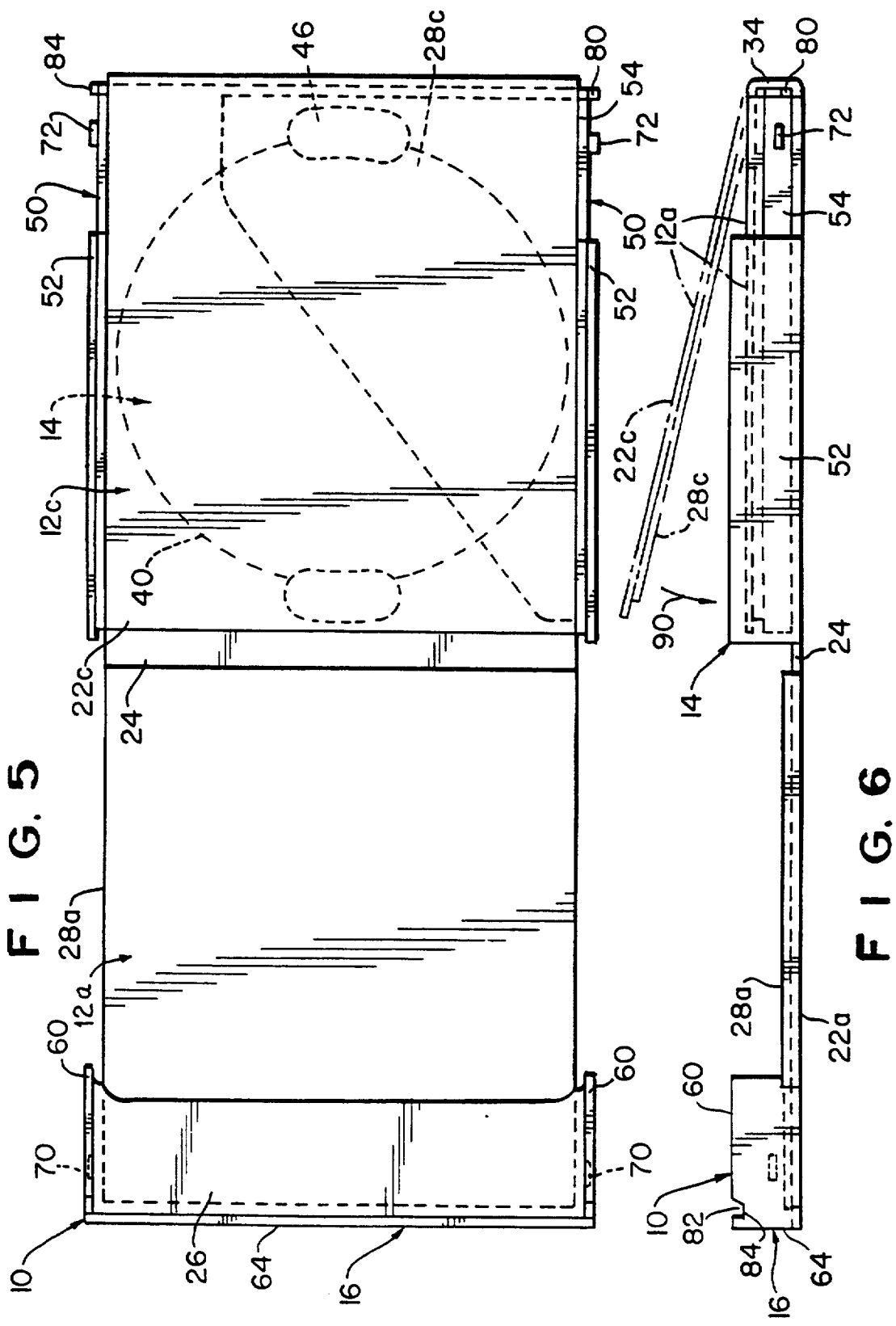

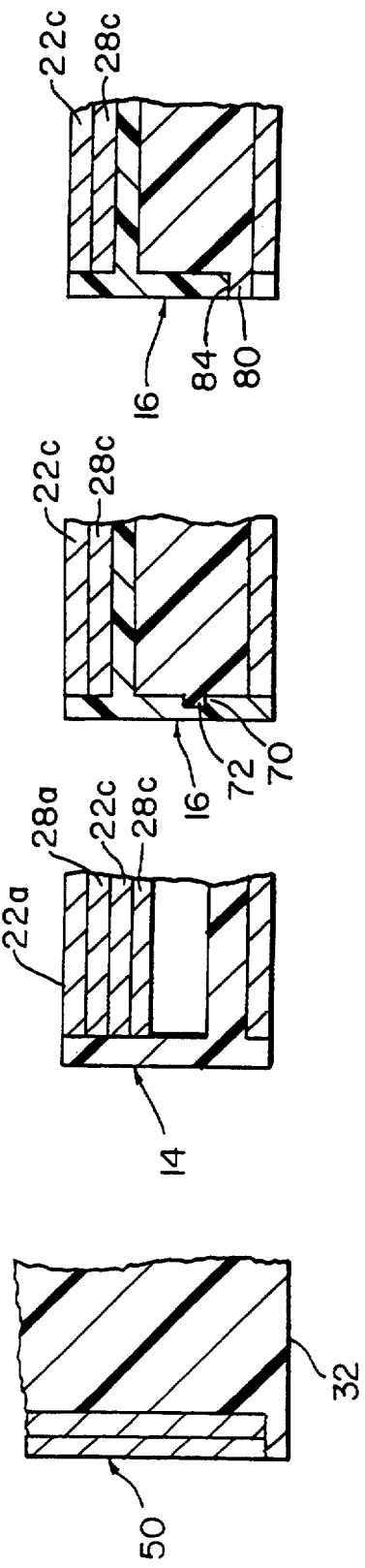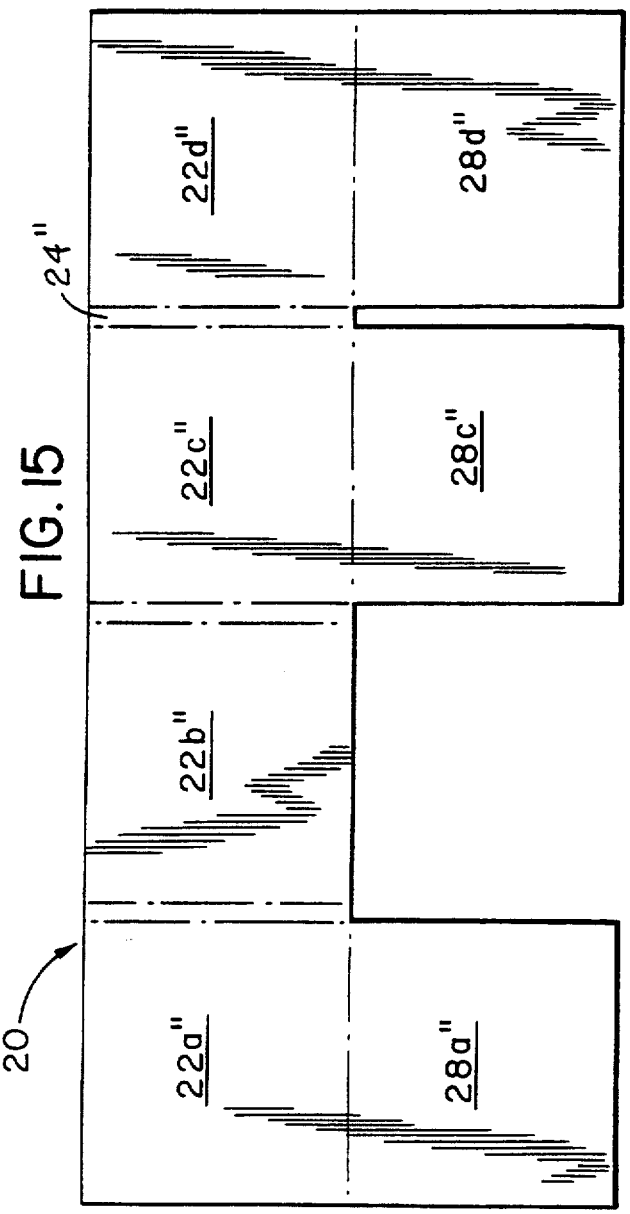

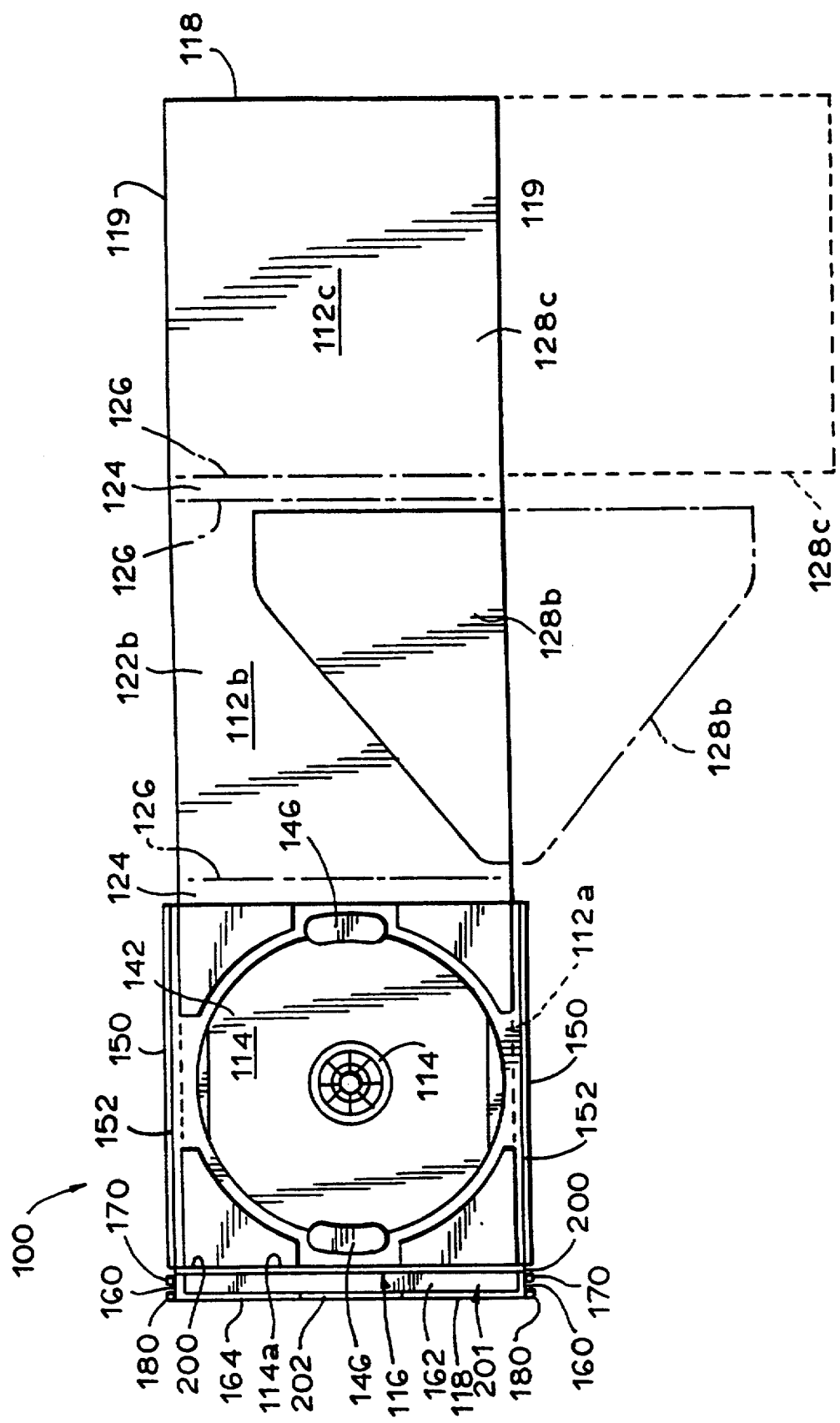

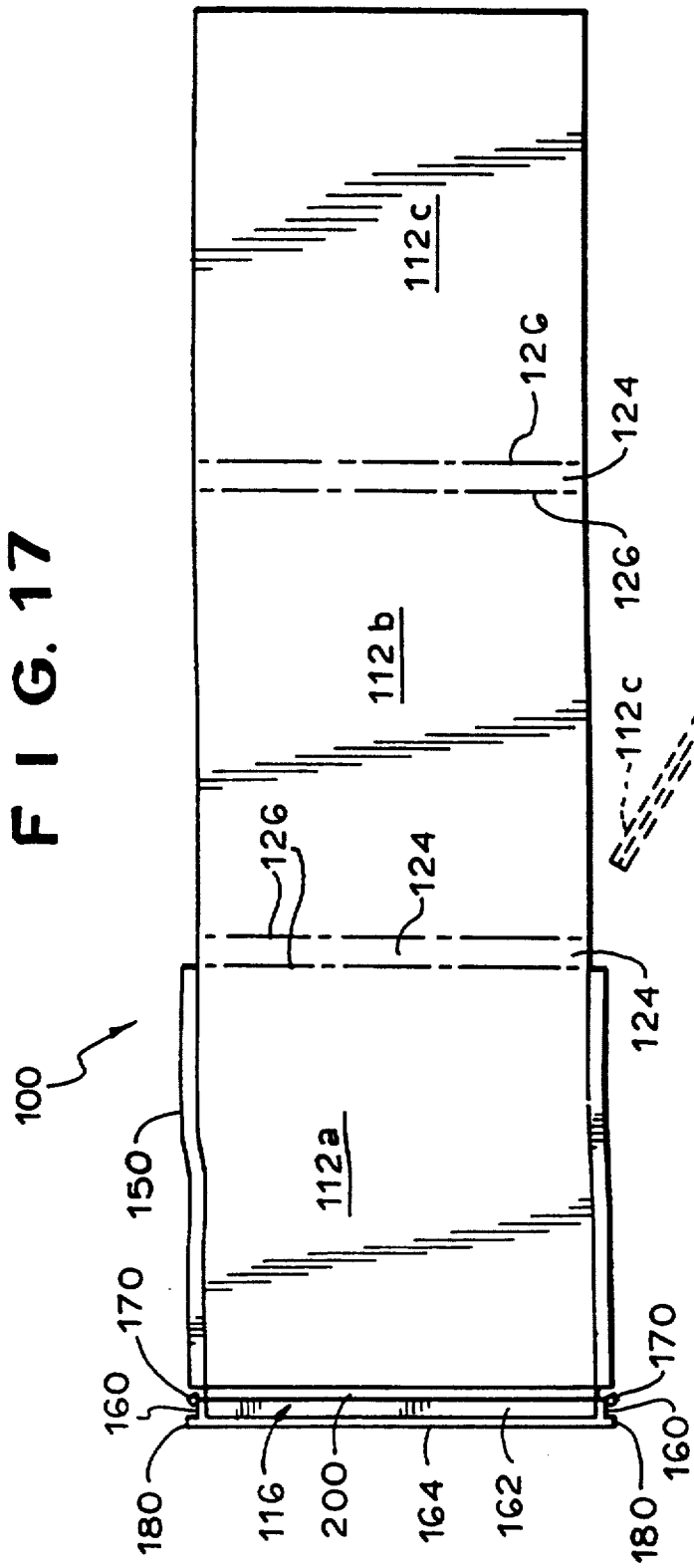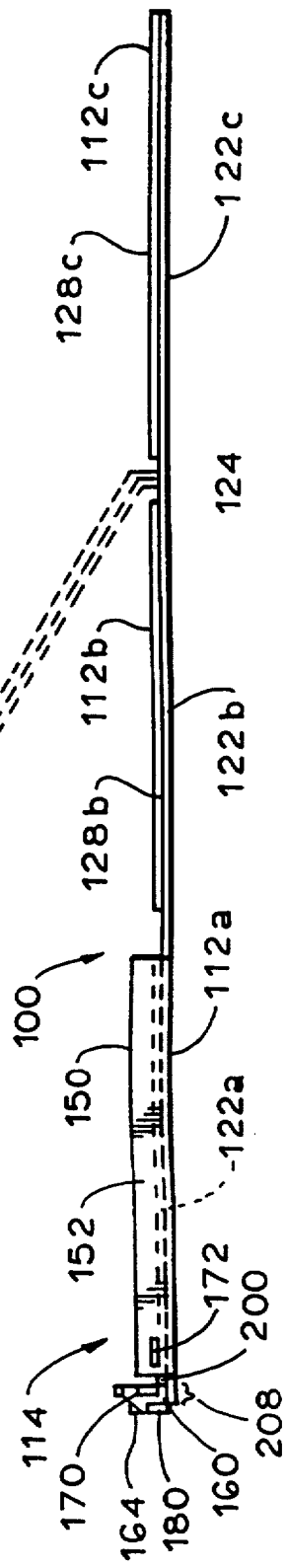
FIG. 17
FIG. 18

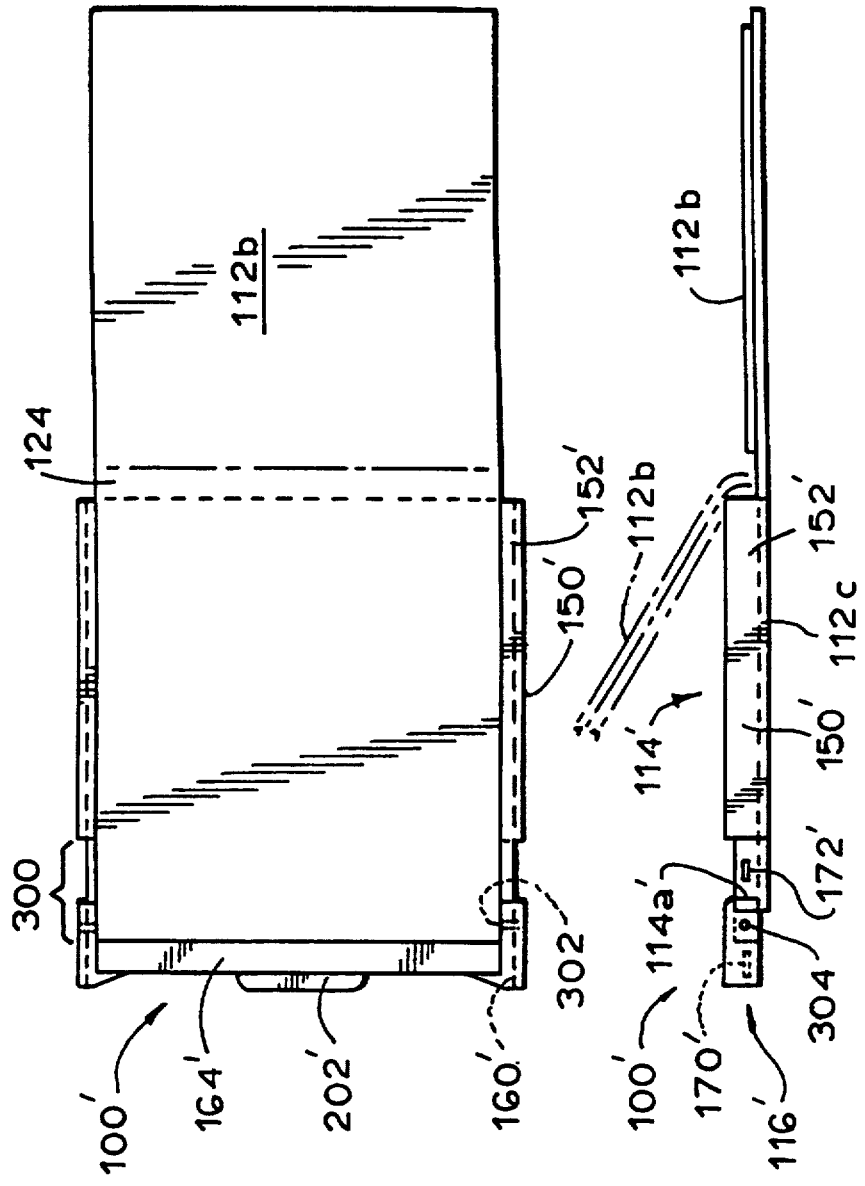

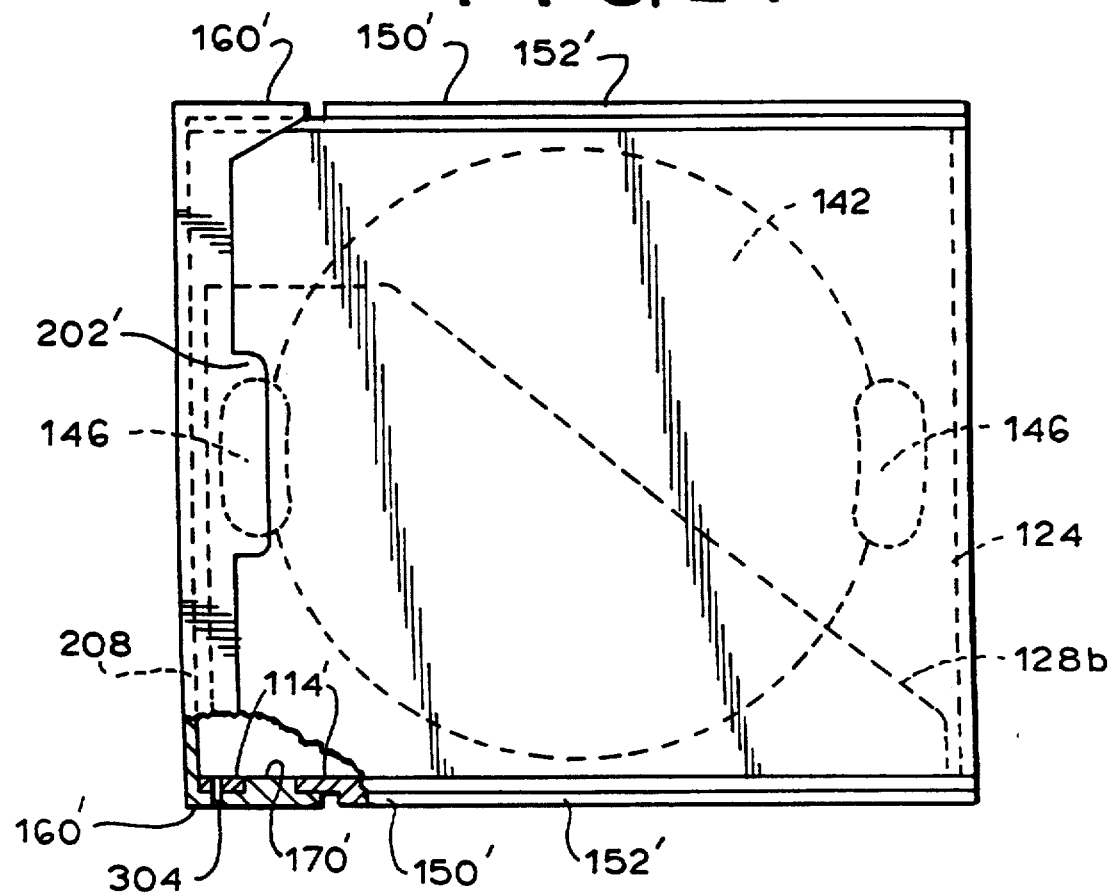

HOLDER/END CAP FOR STORAGE PACKAGE

This is a continuation of copending application(s) Ser. No. 07/817,897 filed on Jan. 8, 1992, now U.S. Pat. No. 5,188,230 itself a continuation in part of Ser. No. 07/807,477, filed Dec. 12, 1991, now U.S. Pat. No. 5,219,417 itself a continuation in part of Ser. No. 07/698,201, filed May 10, 1991, now U.S. Pat. No. 5,205,405.

BACKGROUND OF THE INVENTION

The present invention relates to packaging and, more particularly, to packaging for a compact disc or the like.

U.S. Pat. No. 4,709,812 discloses packaging for a compact disc (CD) or the like which is formed of a plastic CD holder for releasable receiving and holding a CD and a plurality of interconnected non-plastic (typically paperboard) panels which are moveable between an open position where the CD holder and any compact disc thereon are accessible and a collapsed orientation for storage wherein the various panels overlap and protect the CD. The packaging uses less plastic than the well known jewel box (which is formulated almost entirely in plastic), and the plastic which it does use, as well as the paperboard, may be both recycled and recyclable. Nonetheless this packaging has not proven to be entirely satisfactory in use.

As no provision is made for securing the packaging in its collapsed orientation for storage, the packaging can accidentally become opened (i.e., the plurality of panels moved to its open orientation), thus exposing the compact disc to dirt, fingerprints, and the like. Also, the holder has a face which is approximately the same size as, or even smaller than, the paperboard panels so that the edges of the latter are coextensive with or even project outwardly from the holder with the result that they are susceptible to dog-earing, fraying crushing and like disfigurement due to handling. Further, although the spine of the packaging in its collapsed orientation typically contains important identifying information (such as the nature of the matter recorded on the CD) intended to be viewable when the packaging is stored appropriately against like CD packages with only the package edges visible, no protection is provided for the spine so that, with continued handling of the packaging, the spine is subject to deterioration, and with it the identifying information thereon. (This is a special problem since in certain storage devices only the spine is exposed to the viewer and, therefore, the viewer has to forcibly grasp the spine and utilize it in order to separate the desired packaging from the remainder of the packaging in the same storage device.) Where the packaging contains a secondary spine opposite the primary spine, the secondary spine is also subject to dog-earing and the like even though this is of lesser importance than in the case of the primary spine since the secondary spine rarely contains identifying information of importance to the user.

Accordingly, it is an object of the present invention to provide packaging for a compact disc or the like which includes means for maintaining the packaging in its closed orientation.

Another object is to provide such packaging which includes means to prevent dog-eating, fraying or like destruction of the spine.

A further object is to provide such packaging which includes means to prevent dog-earing, fraying or like destruction of the exposed sidewall edges of the paperboard panels.

It is also an object of the present invention to provide such packaging which is ecologically sound, being composed substantially of recycled and/or recyclable plastic and paperboard.

It is another object to provide such packaging which is simple and economical to manufacture.

SUMMARY OF THE INVENTION

It has now been found that the above and related objects of the present invention are obtained in packaging for a compact disc or the like comprising a plurality of non-plastic panels including a pair of end panels and optionally at least one panel intermediate to and connecting the pair of end panels. The plurality of panels is movable between an open orientation enabling access to the contents of the package and a collapsed orientation for storage purposes. Each of the panels has a pair of opposed lateral sidewalls, and the plurality of panels in the collapsed orientation defines at least one spine. A holder formed of plastic is disposed on one of the panels for receiving and maintaining a compact disc thereon. An end cap formed of plastic is disposed on one of the end panels, the end cap being adapted to releasably engage the holder when the plurality of panels is in the collapsed orientation, thereby to preclude accidental movement of the plurality of panels out of the collapsed orientation. Preferably the plurality of panels is formed of paperboard.

In a preferred embodiment, the plurality of panels in the open orientation has no panel overlying the panel on which the holder is disposed, thereby enabling access to the holder and any compact disc thereon, and in the collapsed orientation has each of the panels overlapping one another, thereby to provide a compact package for storage. The holder is disposed on a panel adjacent the one end panel on which the end cap is disposed. When the plurality of panels includes at least one intermediate panel, the holder is disposed on one of the intermediate panels which is immediately adjacent the one end panel. When the plurality of panels is in the collapsed orientation, the other of the end panels and any other of the intermediate panels are disposed intermediate the one end panel and the one intermediate panel.

Typically in the preferred embodiment, the end cap is generally U-shaped and has a pair of upstanding opposed lateral sidewalls defining engaging means and a bight or shank portion connecting the same; and the holder has a generally planar and generally rectangular body and a pair of opposed lateral sidewalls defining engaging means adapted to engage cooperatively with the end cap engaging means.

When the plurality of panels is in the collapsed orientation, the end cap bight portion extends over one spine of the package to protect the same, the end cap bight portion extending over the spine being transparent to enable viewing of any material printed on the spine. The end cap extends upwardly from the panel on which it is disposed to overlap the holder when the plurality of panels is in the collapsed orientation, and also extends downwardly from the panel on which it is disposed sufficiently to overlap and protect adjacent edges thereof. Thus, the end cap extends upwardly and downwardly sufficiently to overlap and protect adjacent portions of the opposed lateral sidewalls and one end of the plurality of panels when the plurality of panels is in the collapsed orientation.

The holder sidewalls extend upwardly above the plane of the holder body for a major length thereof (the holder engaging means being disposed on the remainder of the length thereof) and downwardly below the plane of the holder body for substantially the entire length thereof. More particularly, the holder sidewalls extend downwardly below the plane of the holder body at least the thickness of the panel on which the holder is disposed and, for the major length thereof, upwardly from the plane of the holder body at least the thickness of the remainder of the panels when the plurality of panels is in the collapsed orientation, thereby to overlap and protect the sidewalls of the plurality of panels in the collapsed orientation. Thus, the holder sidewalls extend upwardly and downwardly relative to the plane of the holder body to cover both the sidewalls of the panel on which it is disposed and, in cooperation with the sidewalls of the end cap, the sidewalls of the other of the panels when the plurality of panels is in the collapsed orientation.

Additionally, when the plurality of panels is in the open orientation, the holder sidewalls extend beyond the holder body toward the one end panel on which the end cap is disposed sufficiently that, when the plurality of panels is in the collapsed orientation, the holder sidewalls overlap and protect the sidewalls of the spine not covered by the end cap.

Preferably each of the holder and the end cap defines abutment means adapted to abut one another and limit relative movement in a given direction, thereby to limit the pressure exertable by the end cap on the holder body. The abutment means are optimally on the sidewalls of the holder and the end cap.

The present invention further encompasses a storage package for compact discs and the like having a hinged end cap. The package comprises a plurality of non-plastic panels, a plastic holder and a plastic end cap. The plurality of non-plastic (typically paperboard) panels includes a pair of end panels and optionally at least one panel intermediate to and connecting the pair of end panels. The plurality of panels is movable between an open orientation enabling access to the contents of the package and a collapsed orientation for storage purposes. Each of the panels has a pair of opposed lateral sidewalls. The holder formed of plastic is disposed on one of the end panels for receiving and maintaining a compact disc thereon, the holder having one end thereof remote from the other of the end panels when the plurality of panels are in the open orientation. The end cap formed of plastic has one end thereof directly pivotally secured to the one end of the holder. The end cap also has a portion thereof (spaced from the one end thereof) adapted to releasably engage the holder at a portion thereof spaced from the one end of the holder when the plurality of panels is in the collapsed orientation and to maintain the plurality of panels in the collapsed orientation, thereby to preclude accidental movement of the plurality of panels out of the collapsed orientation.

Generally in the hinged end cap form of the invention, the plurality of panels in the open orientation has no panel overlying the panel on which the holder is disposed, thereby enabling access to the holder and any compact disc thereon, and in the collapsed orientation has each of the panels overlapping one another, thereby to provide a compact package for storage. The end cap is generally U-shaped and has a pair of upstanding opposed lateral sidewalls defining engaging means and a connecting portion connecting the same, and the holder has a generally planar and generally rectangular body and a pair of opposed lateral sidewalls defining engaging means adapted to engage cooperatively with the end cap engaging means. Each of the holder and the end cap defines abutment means adapted to abut one another and limit relative movement in a given direction, thereby to limit the pressure exertable by the end cap on the holder body. Preferably the abutment means are on the sidewalls of the holder and the end cap.

In one variant, the holder sidewalls extend upwardly above the plane of the holder body for a major length thereof, with the holder engaging means being disposed on the remainder of the length of the holder body, but in another variant the holder sidewalls so extend upwardly for the entire length of the holder body, with the holder engaging means being disposed on the holder sidewalls. The holder sidewalls extend downwardly below the plane of the holder body for substantially the entire length thereof. More particularly, the holder sidewalls extend downwardly below the plane of the holder body at least the thickness of the panel on which the holder is disposed and, for the major or entire length thereof, upwardly from the plane of the holder body at least the thickness of the remainder of the panels when the plurality of panels is in the collapsed orientation, thereby to overlap and protect the sidewalls of the plurality of panels in the collapsed orientation. Thus the holder sidewalls extend upwardly and downwardly relative to the plane of the holder body to cover both the sidewalls of the panel on which it is disposed and, either alone or in cooperation with the sidewalls of the end cap, the sidewalls of the other of the panels when the plurality of panels is in the collapsed orientation.

In one embodiment, the end cap is directly pivotally secured to the holder by a living hinge which extends substantially the entire width of the holder. The end cap and the holder are of a unitary, integral, one-piece construction formed in a single molding operation, preferably of polypropylene.

In another preferred embodiment, the end cap is directly pivotally secured to the holder by a spaced pair of pin-and-hole hinges, each of the hinges being disposed at an opposite side of the holder. The end cap may be a different color than the holder.

The end cap preferably extends upwardly and downwardly sufficiently to overlap and protect adjacent portions of the opposed lateral sidewalls of the plurality of panels when the plurality of panels is in the collapsed orientation.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 2 is top plan view of the packaging according to The first embodiment, the packaging being illustrated in the open orientation;

FIG. 3 is a bottom plan view thereof;

FIG. 4 is a side elevational view thereof;

FIG. 5 is a top plan view thereof, to a slightly enlarged scale, in an intermediate orientation between the open and closed orientations;

FIG. 6 is a side elevational view similar to FIG. 5, but with a panel also being illustrated in phantom line in an intermediate position partially, but not fully, folded over;

FIGS. 11, 12, 13 and 14 are sectional views, to an enlarged scale, taken along the lines 11—11, 12—12, 13—13 and 14—14 respectively, of FIG. 8;

FIG. 15 is a top plan view of a blank useful for the paperboard portion of packaging for a four-panel third embodiment of the packaging according to the present invention;

FIG. 16 is a top plan view of the packaging according to a three-panel living hinge fourth embodiment of the present invention, the packaging being illustrated in the open orientation and the folded portions of the blank prior to folding being illustrated in phantom line;

FIG. 17 is a bottom plan view thereof;

FIG. 18 is a side elevational view thereof, but with an end panel also being illustrated in phantom line in an intermediate position partially, but not fully, folded over;

FIG. 22 is a bottom plan view thereof;

FIG. 23 is a side elevational view thereof;

FIG. 24 is a top plan view thereof, to a slightly enlarged scale, in the closed orientation, with portions thereof broken away to reveal details of the internal construction; and FIG. 25 is a side elevational view similar to FIG. 24.

DETAILED DESCRIPTION OF THE PREFERRED EMBODIMENTS

Figure 1:
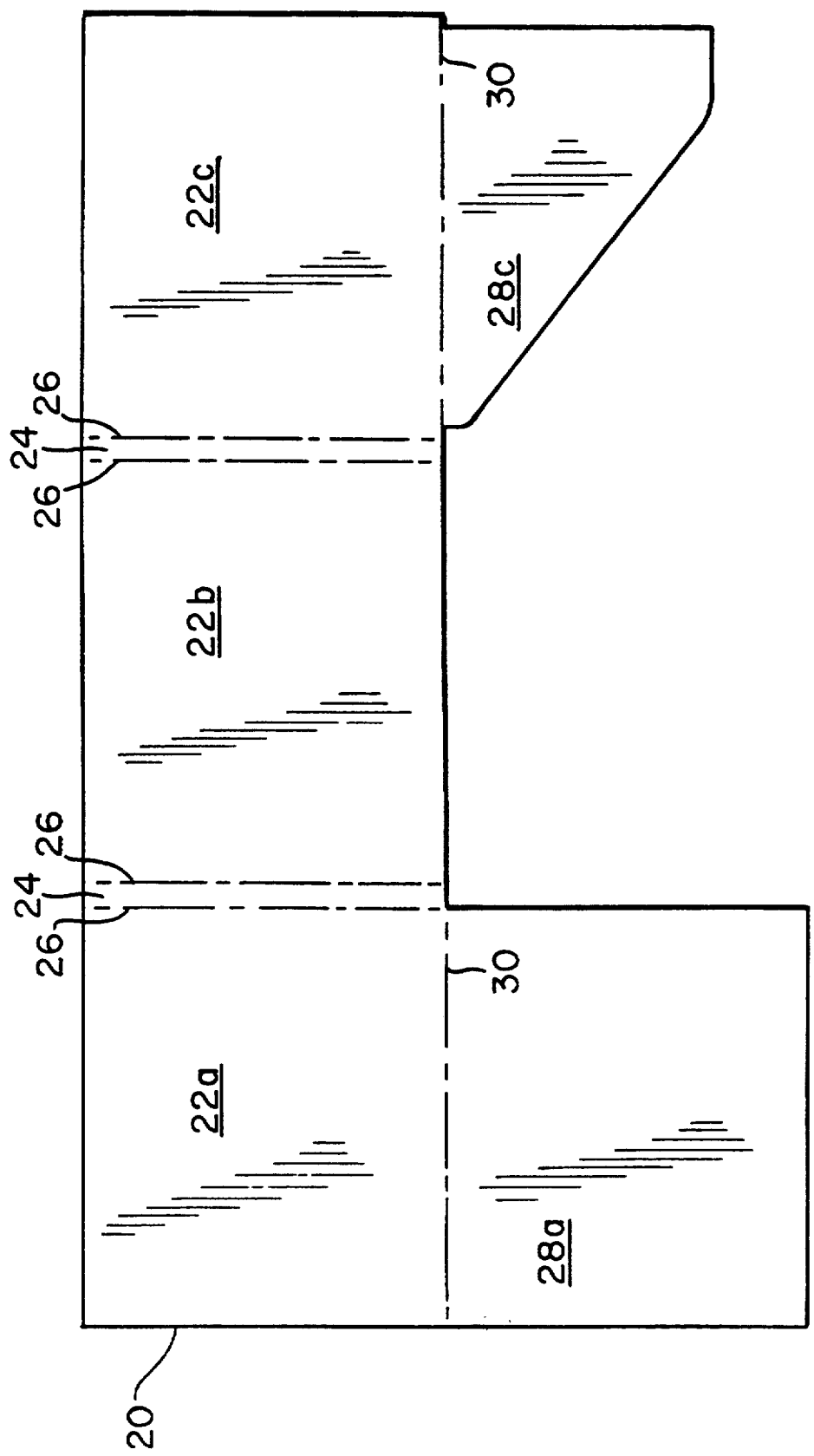
FIG. 1 is a top plan view of a blank useful for the paperboard portion of packaging for a compact disc or the like according to a three panel first embodiment of the present invention.

The present invention is a storage package for compact discs and the like. Encompassed by the term "computer discs and the like" are CD-ROM's, diskettes, and the like, which may be blank or prerecorded and may contain or be adapted to contain music, words, images, binary data, and the like as well as combinations thereof.

Referring now to the drawing, and in particular to FIGS. 2-8 thereof, therein illustrated is a storage pack according to the present invention, generally designated by the reference numeral 10. The storage pack 10 is composed of a plurality of non-plastic panels generally designated 12, a holder formed of plastic generally designated 14, and an end cap formed of plastic generally designated 16. Unlike the all-plastic jewel box conventionally used for the storage of CD's, the packaging of the present invention is to a large degree formed of the non-plastic panels 12, the latter preferably being formed of paperboard which readily decomposes under landfill conditions and is thus more ecologically acceptable than plastic. Moreover, both the paperboard and plastic components of the present invention may be made from recycled materials and are themselves recyclable, thereby rendering the package not only ecologically but also economically sound.

While FIGS. 2-8 illustrate a three-panel embodiment of a package according to the present invention, similar packages utilizing the principle of the present invention may be formed from fewer panels (see the two-panel second embodiment of FIGS. 9 and 10) or more panels (see the five-panel third embodiment of FIG. 13, by way of example).

Referring now to FIG. 1 in particular, the plurality of non-plastic panels 12 may be formed from a prescored, preprinted unitary blank or sheet generally designated 20. The blank 20 is preferably divided into rows. The first row 22 has a number of rectangular sections equal to the number of panels in the plurality (here, three): namely, the sections 22a, 22b and 22c. The three sections 22a, 22b, 22c in the first row 22 are separated from each other by strips 24 having a width which is small relative to the width of the sections, the strips being bounded by foldlines 26. As will become apparent hereinafter, the width of the strips 24 will be determined by the need of the strip to accommodate the gap between adjacent rectangular sections 22 when the plurality of panels 12 is disposed in a collapsed orientation for storage purposes, with each of the panels 12 being in overlapping relationship.

For reasons of economy, the blank 20 is typically multi-color printed on only one surface thereof, although it is desirable for aesthetic reasons that both major surfaces of the panels 12 which will be exposed to view be multi-color printed. The opposed surface of the blank 20 is typically either left in its original color or printed with only a single color. Accordingly, the blank 20 preferably also has a second row 28 composed of one or more unconnected rectangular sections such as section 28a. Accordingly, when rectangular sections 22a and 28a are both multi-color printed on only one surface, one is then folded over a foldline 30 therebetween so as to be in overlapping relationship and define a panel (here panel 12a of FIG. 2) with the multi-color printed surfaces of the sections exposed and the non-multi-color printed surfaces glued together and thus hidden from view.

Preferably, for a variety of reasons, there is no section in the second row 28 adjacent the section 22b, which is adapted to receive the holder 14. First, since section panel 22b will have one surface totally covered by the holder 14, there is no aesthetic reason for having an adjacent section in the row 28. Second, the non-multi-color-printed or non-coated surface of section 22b enables the holder 14 to be better secured thereto than it would be to a multi-color-printed surface. Third, the missing section is not necessary to impart additional strength and rigidity to the section 22b (as it would if the missing section and section 22b were folded over and glued together) since section 22b is subsequently strengthened and rigidified by the presence thereon of the holder 14. Fourth, the missing section would unnecessarily increase the thickness of the entire package in its collapsed orientation, this being a particular problem where the package is intended to occupy the same volume as a conventional jewel box (for example, to enable the use of existing storage facilities for conventional jewel-box CD packaging).

A rectangular section, similar to section 28a of the second row 28, may be placed in the second row adjacent the section 22c of the first row, with a foldline 30 being disposed therebetween. In this case the section 28c may be folded over the foldline 30 and glued to its adjacent section 22c in the same manner as section 28a is folded over and glued to adjacent section 22a to form a panel. However, as it is frequently desirable to place removable literature within the CD packaging (such as a booklet describing the prerecorded matter, the creation of the matter, the artist, instructions for use, or the like), the section 28c may be glued to the section 22c only at the two lateral ends thereof (the end of section 22c adjacent section 22b and the free end thereof) so as to define with section 28c a panel 12c (see FIG. 2) having an open-top pocket into which such literature or booklet may be stored. To facilitate access to the pocket, this section 28c is preferably somewhat in the configuration of a right-angle trapezoid rather than a rectangle, with the free long end of section 28c being glued to the free end of section 22c and preferably the free short end of section 28c being glued to the end of section 22c adjacent section 22b.

Referring now to FIG. 2, the plurality of non-plastic panels 12 formed from the blank 20 (after folding and gluing of the sections of the second row 28 to adjacent sections of the first row 22) include a pair of end panels 12a and 12c and optionally (as illustrated in FIG. 3) at least one panel 12b intermediate to and connecting the pair of end panels 12a, 12c. The plurality of non-plastic panels 12 further defines a pair of opposed free ends 18 and a pair of opposed lateral sidewalls 19. Panel 12b is, of course, composed only of section 22b.

Referring now to FIGS. 5-8 as well, the plurality of panels 12 is movable between an open orientation enabling access to the contents of the package (see FIGS. 2-4), through an intermediate orientation (see FIGS. 5-6) wherein some of the panels (e.g., panels 12b, 12c as illustrated) are overlapping, and a collapsed orientation for storage purposes (see FIGS. 7-8) wherein all of the panels 12a, 12b, 12c are overlapping. In other words, in the open orientation there is no panel overlying the panel 12b on which the holder 14 is disposed, thereby enabling access to the holder 14 and any compact disc thereon, and in the collapsed orientation each of the panels 12a, 12b, 12c overlaps one another, thereby to provide a compact package for storage. The plurality of panels 12 in the collapsed orientation defines a pair of opposed spines 32, 34 for the package (see FIG. 8), a first spine 32 composed primarily of the fold 24 intermediate panels 12a, 12b and a second spine 34 at the opposite end formed by the fold 24 intermediate panels 22b, 22c and the free end of panel 12a.

Referring now to FIGS. 2-4 in particular, the holder 14 preferably comprises an injection molded plastic element which differs in particular respects from the holder found in the conventional prior art jewel box. The holder 14 is disposed on the panel 12 adjacent the end panel on which the end cap 16 is disposed (here, end panel 12a) and, where there is at least one intermediate panel (here, intermediate panel 22b), the holder is disposed on one of the intermediate panels 22b which is immediately adjacent the one end panel 22a to which the end cap 16 is secured. When the plurality of panels 12 is in the collapsed orientation illustrated in FIGS. 7 and 8, the other end panel 12c and any other intermediate panels (not present in the three-panel embodiment) are disposed intermediate the one end panel 12a bearing the end cap 16, and the one intermediate panel 12b bearing the holder 14.

In its conventional aspects, the holder 14 has a generally planar rectangular body 40 defining a recess 42 on the exposed surface thereof configured and dimensioned receive the centrally apertured CD (which is typically approximately 4.7 inches in outer diameter). The depth of the recess 42 is sufficient to ensure that the upper surface of the CD does not extend above the surface of the holder body 40 about the recess 42. A retaining element 44 is centrally disposed in recess 42, projecting upwardly therefrom, for retaining the CD in holder 14. Any of the conventional means for providing frictional engagement between the retaining element 44 and the inner circumference of the CD may be used—for example, upstanding pliable plastic tabs such as those used in the holder of the conventional jewel box to frictionally engage the inner circumference of the central hole of the CD and thus hold the CD in place. Additionally, a plurality of finger slots or recesses 46 (two being illustrated) are preferably provided so that the user can slide a finger below the edge of the CD while simultaneously exerting a slight downward force on the retaining means 44 to facilitate disengagement of the CD from retaining element 44 for removal of the CD from the recess 42. The finger recesses 46 are preferably disposed at opposite ends of a diameter of the holder recess 42 extending from end to end of holder 14, for example, parallel to the sidewalls 50 thereof.

Figure 8:
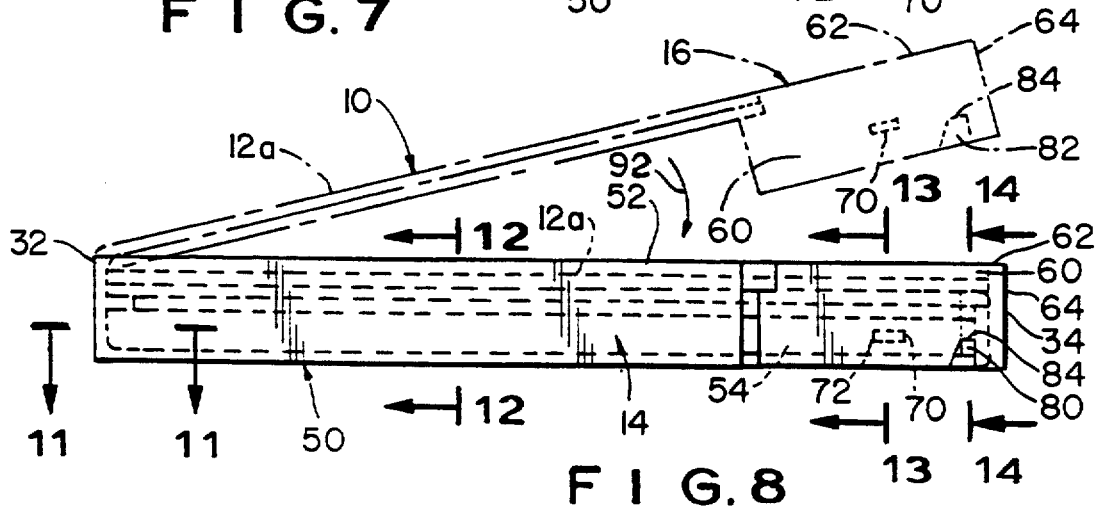
FIG. 8 is a side elevational view similar to FIG. 7, but with another panel being illustrated in phantom line in an intermediate position partially, but not fully, folded over.

The holder 14 further includes a pair of opposed lateral sidewalls generally designated 50, disposed slightly outwardly from the sidewalls 19 on panel 22b on which it is disposed. Each holder sidewall 50 includes a first portion 52 which extends substantially upwardly above the plane of the holder body 42 for a major length of the holder sidewall length (at least half thereof) and a second portion 54 which extends the remaining length 54 of the holder sidewall and does not extend appreciably above the surface of the holder body 40. Each second portion 54 defines, for reasons which will become apparent hereinafter, engaging means 72 adapted to releasably engage the end cap 16. Additionally, holder sidewalls 50 extend appreciably downwardly below the plane of the holder body 42 for substantially the entire length thereof. More particularly, as best illustrated in FIG. 8, the holder sidewalls 50 extend downwardly below the plane of the holder body 40 at least the thickness of the panel 12b on which the holder 14 is disposed and, for the major length thereof, upwardly from the plane of the holder body 40 at least the thickness of the remainder 12a, 12c of the panels when the plurality of panels 12 is in the collapsed orientation. Thus, the holder sidewalls 50 essentially overlap and protect the sidewalls 19 of the plurality of panels 12a, 12b, 12c in the collapsed orientation. As will become apparent hereinafter, the only portion of the panel sidewalls 19 not protected by the holder sidewalls 50 (because the raised holder sidewalls 52 extend only a major portion of the length thereof) are protected by the end cap 16. Accordingly, the holder sidewalls 50 extend upwardly and downwardly relative to the plane of the holder body 40 to cover both the sidewalls 19 of panel 12b on which it is disposed (at all times) and, in cooperation with the sidewalls of the end cap 16, the sidewalls 19 of the other of the panels 12a, 12c (when the plurality of panels 12 is in the collapsed orientation).

Figure 7:
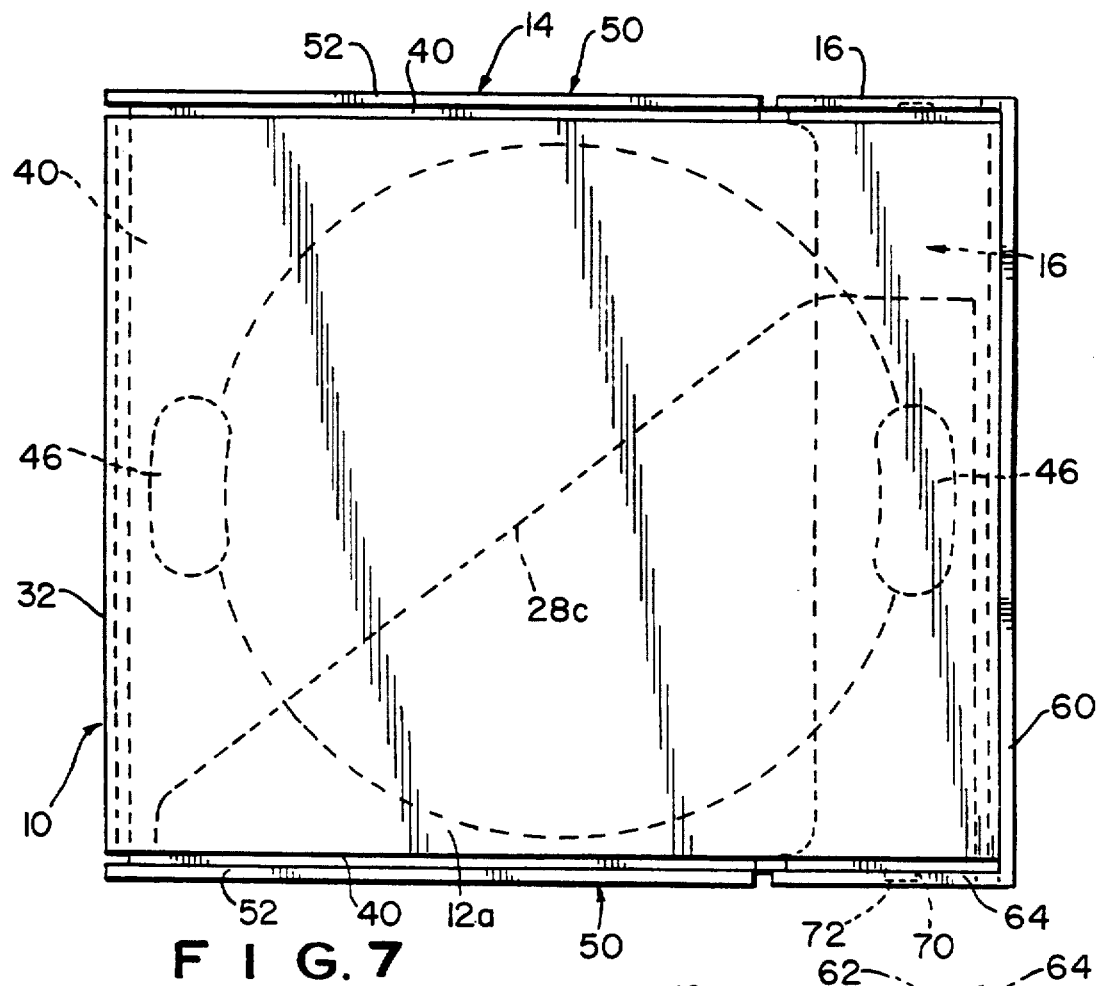
FIG. 7 is a top plan view of the packaging in the closed orientation.

Referring now to FIG. 2 in particular, when the plurality of panels 12 is in the open orientation, the holder sidewalls 50 extend toward the one end panel 12a on which the end cap 16 is disposed sufficiently that, when the plurality of panels 12 is in the collapsed orientation, as illustrated in FIGS. 7 and 8, holder sidewalls 50 overlap and protect the sidewalls of the spine 32 not covered by the end cap 16.

The end cap 16 is preferably comprised as an injection molded plastic element disposed on one of the end panels (here illustrated as panel 12a). The end cap 16 is adapted to releasably engage the holder 14 when the plurality of panels 12 is in the collapsed orientation, thereby to preclude accidental movement of the plurality of panels out of the collapsed orientation. End cap 16 is generally U-shaped and has a pair of upstanding opposed lateral sidewalls 60 and a bight portion 62 connecting the same. Bight portion 62 includes an upstanding end wall 64 configured and dimensioned to cover the spine 34 when the plurality of panels 12 is in the collapsed orientation, as illustrated in FIGS. 7 and 8. With the exception of the upstanding end wall 64 of the bight portion 62 of end cap 14, all of the plastic components of the present invention may be opaque or translucent and are typically black. The upstanding end wall 64 is, however, preferably transparent to enable viewing of any material printed or otherwise disposed on the spine 34, such as an identification of the compact disc disposed within the packaging 10. This permits the contents of the packaging to be determined even when both faces thereof are covered by like packaging, e.g., in a package storage device. Thus the end wall 64 is typically, although not necessarily, formed of virgin plastic to obtain the desired transparency.

The end cap sidewalls 60 and bight end wall 64 extend upwardly from the panel 12a on which the end cap 16 is disposed so as to overlap the holder 14 when the plurality of panels 12 is in the collapsed orientation. To this end, in that orientation the end cap sidewalls 60 are disposed in the same plane as the raised holder sidewall portions 52, both extending slightly beyond the panel sidewalls 19. The length of the end cap sidewalls 60 corresponds to the length of the non-raised sidewall portions 54 of the holder sidewalls 50 so that, when the plurality of panels 12 is in the collapsed orientation illustrated in FIGS. 7 and 8, the end cap sidewalls 60 cooperate with the holder sidewalls 50 to cover and protect the sidewalls 19 of the panels therebetween. Additionally, the end cap 16 also extends downwardly from panel 12a on which it is disposed sufficiently to overlap and protect the adjacent edges thereof—namely, the free end 18 and portions of the sidewalls 19 of panel 12a. Thus, the end cap extends upwardly and downwardly sufficiently to overlap and protect the adjacent portions of the opposed lateral sidewalls 19 of the panels 12 as well as the spine 34 when the plurality of panels 12 is in the collapsed orientation.

The end cap sidewalls 60 define engagement means 70 adapted to releasably engage cooperating engagement means 72 on holder sidewall portions 54. As illustrated, the end cap engaging means 70 is illustrated as an inwardly extending recess on the inner surface of each end cap sidewall 60, and the holder engaging means 72 is illustrated as an outwardly extending projection on the outer surface of an end cap sidewall portion 54, the recess 70 being adapted to receive and releasably maintain a projection 72 therein, thereby to preclude accidental opening of the package (that is, accidental movement of the plurality of panels 12 out of the collapsed orientation). Clearly, however, the recess 70 could be on the holder sidewall portion 54, and the projection 72 could be on the end cap sidewall portion 60; indeed, easily releasable engagement means other than a recess-and-projection system may be substituted.

In order to limit the pressure exerted by end cap 16 on holder body 40, and thus on any compact disc disposed within holder recess 42, holder 14 defines abutment means 80 in the form of a lug extending outwardly from each sidewall portion 54 thereof adjacent the end of the holder 14, and each sidewall 60 on the end cap 16 defines an abutment means 84 in the form of a recess 82. The holder abutment means 80 and the end cap abutment means 84 are adapted to abut one another when the plurality of panels 12 is in the collapsed orientation, thereby to limit relative movement of the holder 14 and end cap 16 relative to one another in a given direction.

To use the packaging in its open orientation, a compact disc is placed within the recess 42 of holder 14, on the retainer 44 thereof, and the packaging is then moved from its open orientation (illustrated in FIGS. 2 through 4) into its intermediate orientation (illustrated in FIGS. 5 and 6) by moving the panel 12c in the direction of arrow 90, and finally into its closed orientation (illustrated in FIGS. 7 and 8) by moving panel 12a in the direction of arrow 92. In this closed orientation, the holder sidewalls 50 in cooperation with the end cap 16 protect the panel sidewalls 19 and the spines 32, 34. The transparent end cap wall 64 projects the spine 34 covered by end cap 16 while permitting viewing thereof, and the ends of holder sidewalls 50 projecting laterally beyond the holder body portion 40 protect the edges of the spine 32 not covered by the end cap 16. The end cap 16 and the holder 14 cooperate to maintain the package in a collapsed orientation wherein the sidewalls of the various panels are fully protected against dogearing, fraying and the like.

Figure 9:
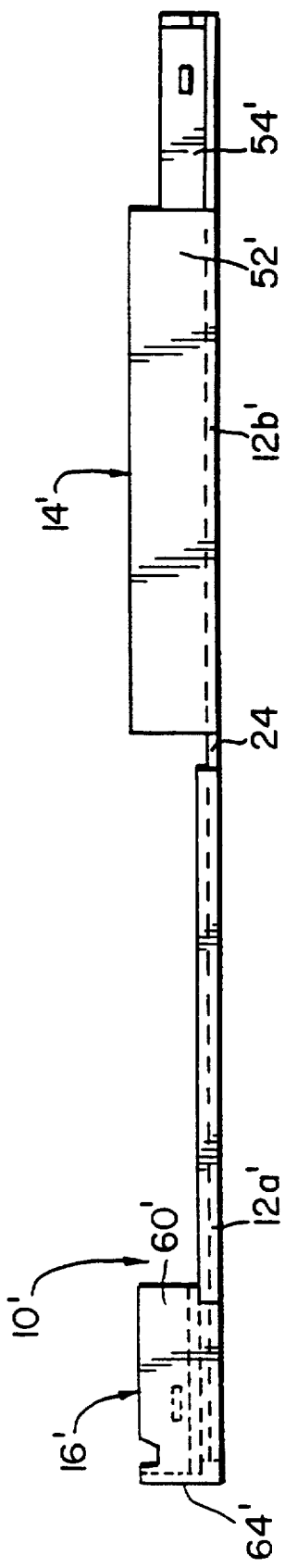
FIG. 9 is a side elevational view of a two-panel second embodiment of the packaging of the present invention in the open orientation.
Figure 10:
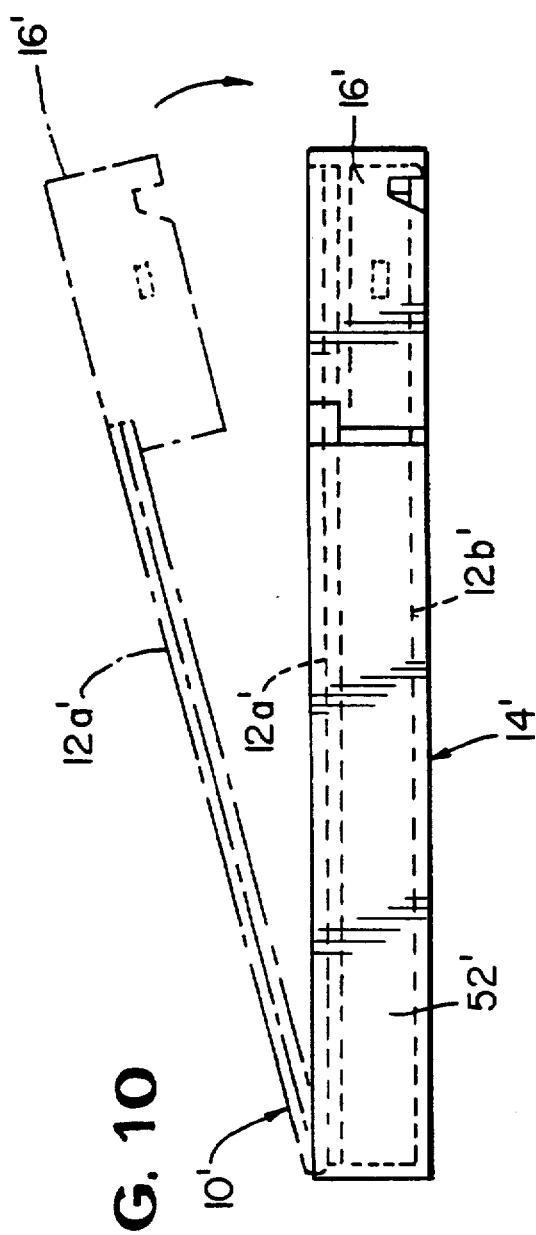
FIG. 10 is a side elevational view of the two-panel packaging in the closed orientation, but with one panel being shown in phantom line in an intermediate position partially, but not fully, folded over the other panel.

Referring now to FIGS. 9 and 10, therein illustrated is a second embodiment 10' of the present invention having only two panels 12a' and 12b'. Holder 14' is disposed on end panel 12b' and end cap 16' is disposed on end panel 12a'. In its functional aspects the package 10' is identical to the threepanel package of embodiment 10 except that the width of the strip 24 may be slightly reduced since there is no panel akin to panel 12c to be accommodated between panels 12a' and 12b' and, for the same reason, the upstanding elements of end cap 16' (sidewalls 60' and end wall 64') and holder 14' (raised sidewalls 52') may be reduced in height.

Referring now to FIG. 15, therein illustrated is a third embodiment 20" of a blank used to form a four-panel packaging according to the present invention. The rectangular sections 22a", 22b", 22c" of the first row 22" and rectangular section 28a" of the second row 28" are similar to sections 22a, 22b, 22c of the first row and section 28a of the second row, respectively, of the blank 20 of the first embodiment 10. The additional panels 22d" of the first row and 28c" and 28d" of the second row are simply provided in order to define more printing area—e.g., for additional information pertinent to the subject matter of the compact disc or even simply even unrelated advertising. Although end sections 22a'' and 22d'' of the first row are shown as having adjacent panels 28a'' and 28d'', respectively, in the second row, clearly any of the intermediate panels in the first row 22'' (e.g., 22c'') may also or alternatively be provided with adjacent sections in the second row 28'' (e.g., 28c''), as illustrated, preferably excepting the section on which the holder is disposed. The holder is preferably disposed on intermediate section 22b'' (adjacent to end panel 22a'' which receives the end cap) but may be alternatively disposed. The width of each strip 24'' is, of course, appropriately adjusted to facilitate movement of the plurality of panels to the collapsed orientation.

In each of the three embodiments 10, 10', 10'' described hereinabove, the holder 14 and end cap 16 are separate, the end cap 16 being disposed on an end panel 12 and the holder 14 being disposed on a panel next to an end panel (which may itself be an end panel in a two panel embodiment). Thus there is a significant limitation as to where the holder 14 and end cap 16 may be disposed. Additionally, although for manufacturing economy the end cap 16 may be injection molded as a part of the holder 14 during the injection molding process, the end cap 16 must then be separated from the holder 14 and separately assembled to the plurality of panels by gluing. These additional operations increase the manufacturing cost of product and, while the cost of the additional glue used to secure the end cap 16 to one of the panels 12 is minimal, the additional quantity of glue is undesirable since the preferred glue is a hot melt adhesive which can adversely affect the ease of recyclability of the package. Accordingly, the present invention further contemplates further embodiments of the present invention wherein the plastic end cap is directly pivotally secured to the plastic holder (rather than indirectly via a paperboard panel) so that the amount of glue used in the package is reduced since there is no need to glue the end cap to a panel. Manufacturing flexibility is enhanced because the holder may now be placed on an end panel of the package (regardless of the number of panels present in the package), and the manufacturing costs are reduced since there is no need to separate the end cap and the holder and then glue the end cap to one of the panels.

Referring now to FIG. 16, therein illustrated is a fourth embodiment of the present invention, generally designated 100, wherein the end cap is directly pivotally attached to the holder by a living hinge. Elements of the fourth embodiment corresponding in structure and function to elements of the first, second or third embodiments are identified by corresponding numerals in the 100 series. Since the holder 114 will be disposed on end panel 112a of the first row 122 there is no section 128a adjacent section 122a; on the other hand, there is a section 128b in the second row 128 adjacent the second section 122b. It will be appreciated that while a three panel embodiment is illustrated, fewer panels (as in the fifth embodiment to be discussed below) or more panels may be used. Preferably the panel 112 on which the holder 114 is disposed defines an extension 208 beyond the end of the holder 114 so as to enable the extension 208 to wrap around and cover the back surface of the end cap 116, as will be explained in greater detail hereinafter.

While the open-top pocket for holding literature or a brochure is illustrated as being defined by panel 112b, clearly the same could be defined instead by panel 112c or dispensed with entirely (in which case the partial section 128b would typically be full sized and completely cover the opposing face of section 122b). Panel 112a is, of course, composed of only the single section 122a as that is the panel on which the holder 114 will be disposed.

Figure 19:
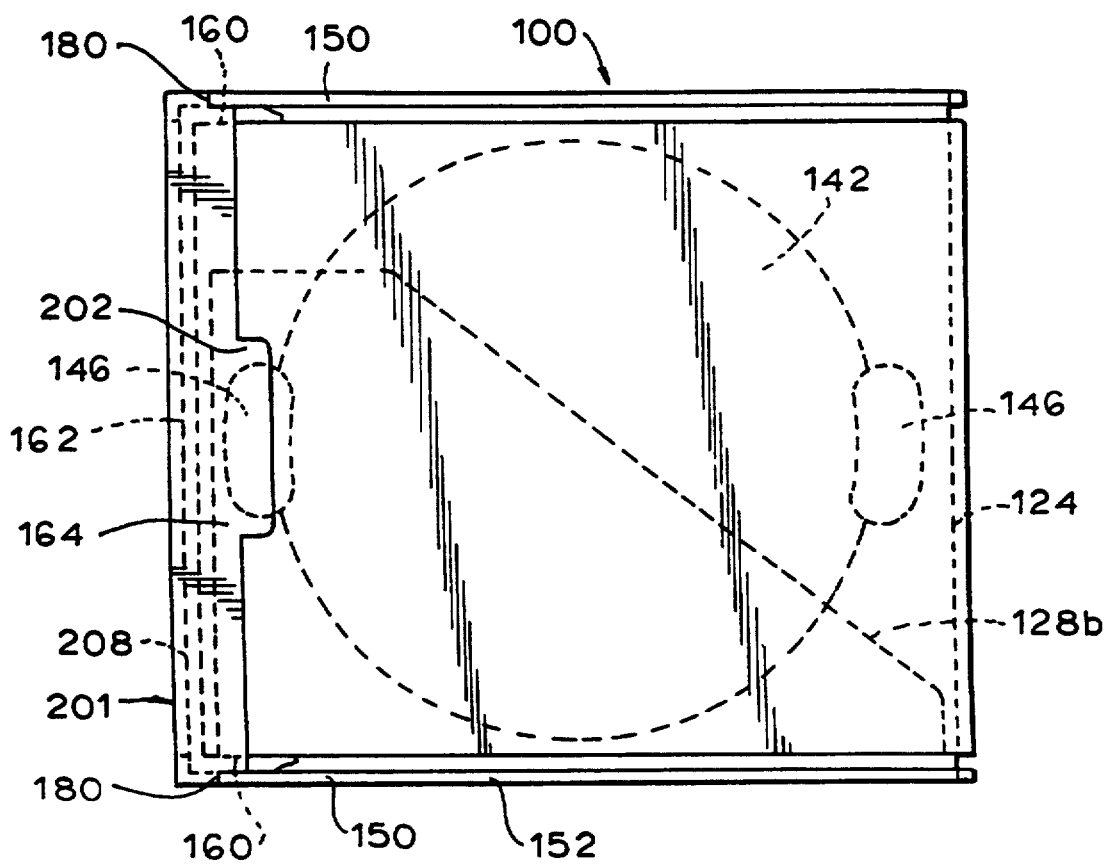
FIG. 19 is a top plan view thereof to a slightly enlarged scale, in the closed orientation.
Figure 20:
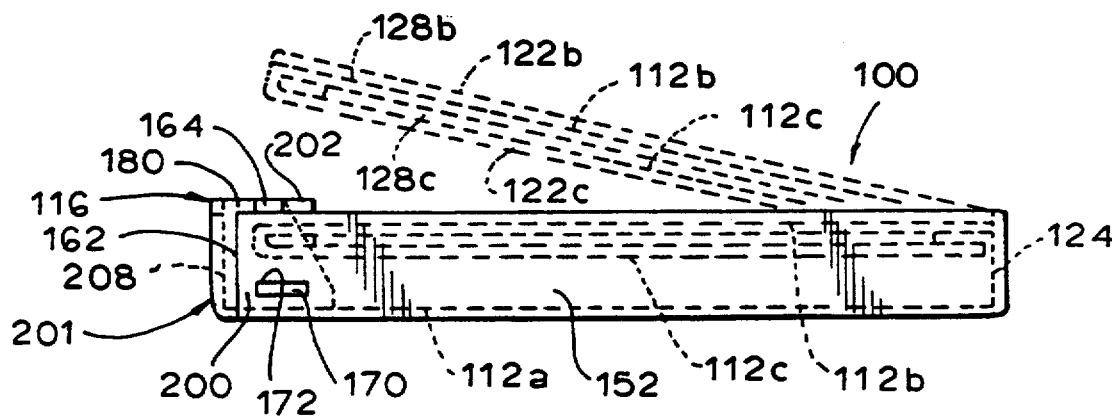
FIG. 20 is a side elevational view similar to FIG. 19, but with two panels being illustrated in phantom line in an intermediate position partially, but not fully, folded over.

Referring now to FIGS. 16–18 in particular, the holder 14 is disposed on an end panel (here, end panel 112a, but optionally end panel 112c). When the plurality of panels is in a collapsed orientation as illustrated in FIGS. 19–20, the other end panel 112c and any intermediate panels (here, panel 112b) are disposed intermediate the end panel 112a bearing the end cap 116 and a portion 164 of the end cap 116. Unlike the sidewalls 50 of the holder 14, the sidewalls 150 of the holder 114 include a first portion 152 which extends substantially above the plane of the holder body for essentially the entire length of the holder 114 (there being no sidewall portion corresponding to portion 54) and the first portion 152 defines engagement means, illustrated as an aperture 172 disposed above the plane of the end panel 112a, which functions to releasably engage cooperating engagement means disposed on the end cap 116. All portions of the end panel sidewalls 118 are protected by the holder sidewalls 150.

The plastic end cap 116 according to the fourth embodiment 100 is not disposed on one of the paperboard panels (as in the previously described embodiments 10, 10' 10''), but is rather directly pivotally secured to the holder 114, and more particularly to the adjacent end 114a of the holder 114. (In other words, end cap 116 is disposed on the holder end 114a remote from the intermediate panel 112b and end panel 112c as illustrated in FIG. 17.) The end cap 116 is secured to the holder end 114a by a living hinge 200 and is of unitary, one-piece, integral construction with the holder 114, both being formed together in a single molding operation. The plastic utilized for the holder 114 and end cap 116 (and, of course, living hinge 200) must be strong, yet substantially flexible when thin so as to be capable of forming a living hinge, and polypropylene is preferred. The living hinge 200 extends substantially the entire width of the holder 114 between the sidewalls 150 thereof. The living hinge 200 is preferably formed as a line of reduced thickness in the plastic intermediate holder 114 and end cap 116, with the facing portions of those elements adjacent the living hinge 200 preferably being beveled so as to enable a pivotal movement of the end cap 116 through at least 90°. The end cap 116 is thus typically the same color as the holder 114 and, unlike holder 14, devoid of any transparent portion.

End cap 116 is generally U-shaped and has a pair of upstanding opposed lateral sidewalls 160 and a connecting portion generally designated 201, connecting the same. The connecting portion 201 is "L-shaped in cross-section and includes a bight portion 162 and an upstanding end wall 164 which is perpendicular to bight portion 162. The end wall 164 is configured and dimensioned to serve as a latch and preferably includes a lip 202 on its free end to facilitate grasping of end cap 116 and improve the leverage exertable thereon by a user. End cap 116 is pivotable about the living hinge 200 from a non-latching orientation wherein the bight portion 162 is in generally the same plane as the holder 114 and the end wall 164 is transverse thereto (as illustrated in FIGS. 16–18) and a latching orientation wherein the bight portion 162 is substantially transverse to the plane of the holder 114 and the end wall 164 is generally parallel thereto (as illustrated in FIGS. 19–20). The end cap sidewalls 116 are connected directly to both bight portion 162 and end wall 164, and each defines an engagement means 170, illustrated as an outwardly projecting lug, adapted to releasably engage the cooperating engagement means 172, illustrated as an aperture or recess on the holder sidewall 152.

As illustrated, end cap engaging means 170 are outwardly projecting lugs on the outer surface of each end cap sidewall 160, and the holder engaging means 172 are apertures or recesses on each holder sidewall 150, configured and dimensioned to receive and releasably retain projecting lugs 170 therein, thereby to preclude accidental movement of the plurality of panels 112 out of the collapsed orientation. Clearly, however, the apertures 172 could be on the end cap sidewalls 160 and the projecting lugs 170 could be on the holder sidewalls 150. Indeed, easily releasable engagement means other than an aperture-and-lug system may be substituted.

In order to limit the pressure exerted by the end cap latch 164 on the holder 114, and thus on any compact discs disposed within the holder recess 142, end cap 116 defines abutment means 180 in the form of a lug extending outwardly from each sidewall portion means 160 thereof, and each holder sidewall 150 defines a fixed upper abutment surface which is adapted to engage a lug 180 and function as a stop to limit movement of the end cap 116 from its non-latching orientation beyond its latching orientation. Alternatively, or in addition thereto, the appropriately beveled surfaces of the holder 114 and end cap 116 about the living hinge 200 may also limit the pressure exerted downwardly by the end cap latch 203 on holder 114.

The sidewalls 160 of the end cap 116 are spaced apart such that they are readily received between the sidewalls 150 of the holder 114 as the end cap 116 is moved into the latching orientation, with the engagement means 170, 172 of the end cap 116 and the holder 114, respectively, releasably engaging. To enable easy pivotal movement of the end cap 116 to the latching orientation, the holder sidewalls 150 about the engagement means 172 and adjacent the living hinge 200 are preferably resiliently outwardly flexible so as to flexingly accommodate passage of the lugs 170 between holder sidewalls 150 until the lugs 170 seat in the apertures 172. Alternatively or addition thereto, the end cap sidewalls 160 may be resiliently inwardly flexible.

As earlier mentioned, the panel 112a (formed of section 122a) preferably defines an extension 208 at its free end, the extension 208 being glued to the outer surface of bight portion 162 of the end cap 116. The extension 208 serves as a spine for the embodiment 100 and is printed with identifying information for the CD in the package 100. Preferably the outer surface of end cap bight portion 162 defines a recess adapted to receive the extension 208 therein so that the edges of extension 208 are protected against dog-earing, fraying or the like.

Referring now to FIGS. 21–25, therein illustrated is a fifth embodiment 100' which is similar to the fourth embodiment 100 except that the end cap and the holder are connected by a pair of pin-and-hole hinges rather than a living hinge. Elements of the fifth embodiment corresponding in structure or function to elements of the fourth embodiment are identified by corresponding numerals primed.

Figure 21:
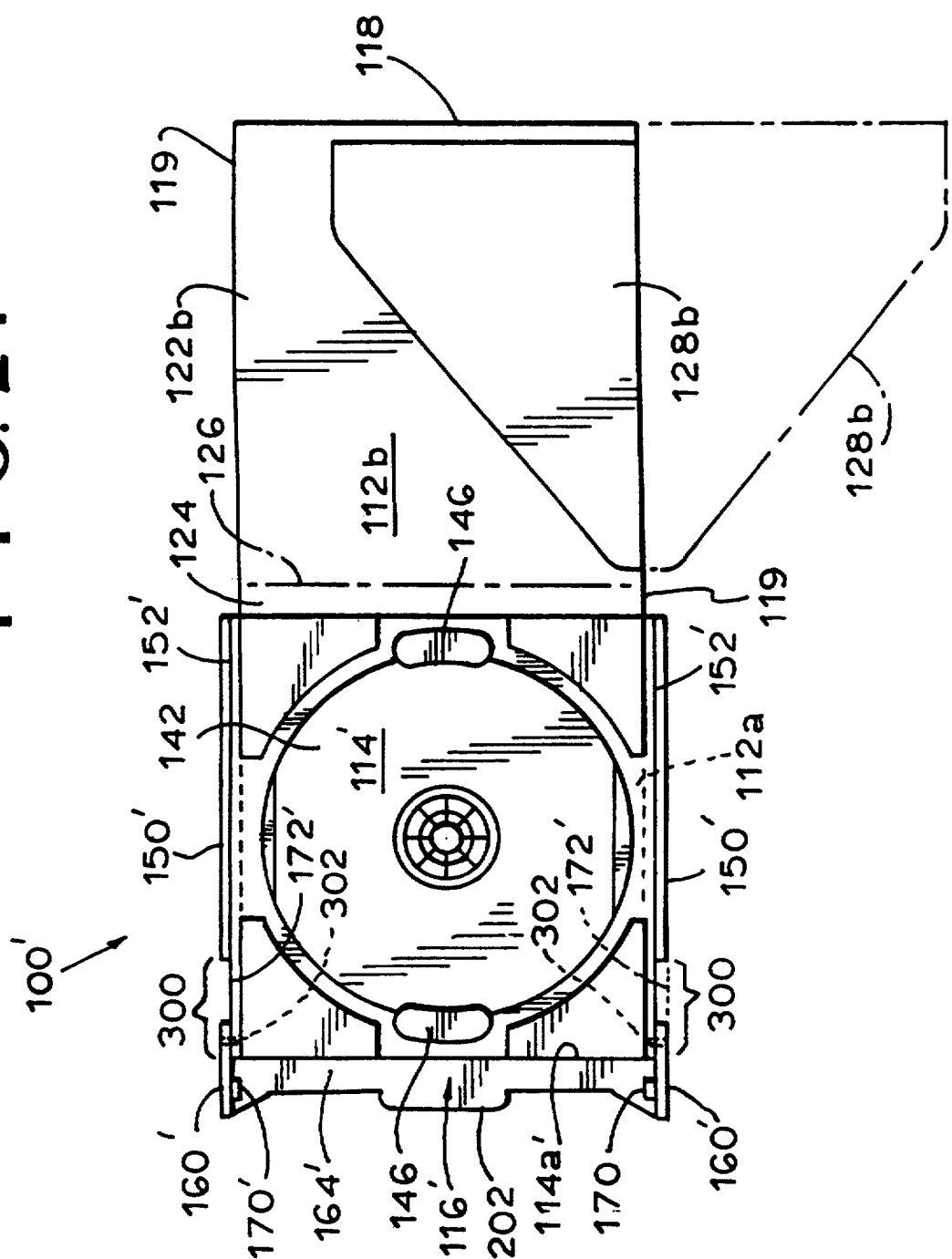
FIG. 21 is a top plan view of the packaging according to a two-panel pin-and-hole hinge fifth embodiment of the present invention, the packaging being illustrated in the open orientation and the folded portion of the blank prior to folding being illustrated in phantom line.

Referring now to FIG. 21 in particular, the blank used in the fifth embodiment 100' is substantially similar to the blank used in the fourth embodiment 100 except that, since the fifth embodiment 100' is illustrated as a two-panel embodiment, there is no panel corresponding to panel 112c (or the sections 122c and 128c from which panel 112c would be formed. Clearly, however, the fifth embodiment 100' could alternatively have a greater number of panels 112. Further, the extension 208 of panel 112a is glued not to the end cap (as in the fourth embodiment 100), but rather to the end 114a' of the holder 114' adjacent the end cap 116'. While the extension 208 may be partially or wholly concealed by the end cap 116' when the plurality of panels is in the open orientation, when the plurality of panels is in the closed orientation (as illustrated in FIGS. 24–25) the extension 208 is easily visible.

The holder 114' of the fifth embodiment 110' is in most respects similar to the holder 114 of the fourth embodiment 100, but the raised sidewall portions 152' thereof do not extend to the holder edge 114a' and thereby leave a sidewall portion 220 of the main holder body exposed. Disposed on each exposed holder sidewall portion 220 are engaging means 172', illustrated in the form of a recess or aperture adjacent the end of the first portion 152' of the holder sidewall 150', and a pin-receiving aperture or recess 302 adjacent the holder end wall 114a' and thus the end cap 116'.

The end cap 116' of the fifth embodiment 100' is generally similar to the end cap 116 of the fourth embodiment 100, but differs in certain critical respects. The end cap 116' is generally U-shaped and defines a pair of upstanding sidewalls 160' and a connecting portion 201' which connects the same and serves as the end wall 164' (there being no portion corresponding to bight portion 162 of the fourth embodiment 100). The end cap sidewalls 160' are further spaced apart so that they are in the same planes as the holder sidewalls 150'. Each of the end cap sidewalls 160' defines an inwardly projecting pin 304 (best seen in FIG. 24) which is pivotably received within the holder aperture or recess 302 to define a pin-and-aperture hinge. The two pin-and-aperture assemblies 304, 302, one at each side of the holder 114', defines a pair of hinges enabling pivoting of the end cap 116' relative to the holder 114' between the unlatching orientation and the latching orientation. When the package is in the closed orientation, the end cap sidewalls 160' extend to or almost to, the ends of the holder sidewall portions 152' (so as to cover the exposed holder sidewall portions 220) and cooperate therewith in protecting sidewalls 118 of the panel 112b from dog-earing, fraying or the like.

While the living hinge 200 of the fourth embodiment 100 is illustrated as connecting the end cap 116 to the bottom of the holder 114 (that is, the portion of holder 120 closely adjacent to the panel 112a on which it is secured), alternatively the living hinge 200 may connect the end cap 116 to the top of the holder 114. In substance, the living hinge 200 would then directly connect the holder 114 and the upstanding end wall 164 of end cap 116, with the end cap sidewalls 160 extending transversely to the upstanding end wall 164. In such a variant of the fourth embodiment 100, the holder 114 and end cap 116 would typically be similar in structure to the corresponding elements 114', 116' of the fifth embodiment 100' except that living hinge 200 would be employed instead of the pins 304 and apertures 302.

Indeed, in another variant of the fourth embodiment wherein the living hinge connects the end cap 116 to the top of the holder 114 (rather than the bottom thereof), the sidewalls 160 of the end cap 116 may be closer together than the sidewalls 150 of holder 114 and downwardly extending slots may be provided in the upper surface of the holder 114 for receipt therein of the end cap sidewalls 160 when the end cap 116 is in the latching orientation. An aperture on one side of each slot would receive the projecting lugs of the end cap sidewalls in order to releasably maintain the end cap 116 in the latched orientation.

Thus it will be appreciated that, depending upon the preferred variant, the sidewalls of the end cap may be disposed either within the same plane as the sidewalls of the holder or closer to one another. Typically the sidewalls of the end cap should not be disposed outwardly of the planes of the sidewalls of the holder as this increases the overall size of the packaging without a corresponding benefit.

To summarize, the present invention provides packaging for a compact disc or the like which includes means for maintaining the packaging in the collapsed orientation, and means to prevent dog-earing, fraying or like destruction of the spines and the exposed sidewall edges of the paperboard panels. The package is ecologically sound, since it may be composed substantially of recycled and/or recyclable plastic and paperboard, as well as being simple and economical to manufacture.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A holder/end cap element for use in a storage package for a recording medium having a plurality of non-plastic panels movable longitudinally between an open orientation enabling access to the contents of the package and a collapsed orientation for storage purposes and including a pair of end panels, said element comprising:
   (A) a holder formed of plastic and adapted to be disposed on one of the end panels of the plurality of panels for receiving and maintaining a recording medium thereon; and
   (B) an end cap formed of plastic and having a longitudinal dimension substantially less than that of said holder so that said end cap can cover at most a minor portion of said holder, one end of said end cap being directly pivotally secured to one end of said holder, said end cap having a portion thereof longitudinally spaced from said one end thereof adapted to releasably engage said holder at a portion thereof longitudinally spaced from said one end of said holder when the plurality of panels is in the collapsed orientation and to maintain the plurality of panels in the collapsed orientation, thereby to preclude accidental movement of the plurality of panels out of the collapsed orientation.

2. The element of claim 1 wherein said end cap is directly pivotally secured to said holder by a living hinge.

3. The element of claim 2 wherein said living hinge extends substantially the entire width of said holder.

4. The element of claim 2 wherein said end cap and said holder are of a unitary, integral, one-piece construction formed in a single molding operation.

5. The element of claim 2 wherein said plastic is polypropylene.

6. The element of claim 1 wherein said end cap is directly pivotally secured to said holder by a spaced pair of pin-and-hole hinges.

7. The element of claim 6 wherein each of said hinges is disposed at an opposite side of said holder.

8. The element of claim 6 wherein said end cap is generally U-shaped and has a pair of upstanding opposed lateral sidewalls defining engaging means and a connecting portion connecting said end cap sidewalls, and said holder has a generally planar and generally rectangular body and a pair of opposed lateral sidewalls defining engaging means adapted to engage cooperatively with said end cap engaging means.

9. The element of claim 6 wherein said end cap is a different color than said holder.

10. The element of claim 1 wherein said end cap is generally U-shaped and has a pair of upstanding opposed lateral sidewalls defining engaging means and a connecting portion connecting the same, and said holder has a generally planar and generally rectangular body and a pair of opposed lateral sidewalls defining engaging means adapted to engage cooperatively with said end cap engaging means.

11. The element of claim 10 wherein said holder sidewalls extend upwardly above the plane of said holder body for a major length thereof, said holder engaging means being disposed on the remainder of the length thereof.

12. The element of claim 11 wherein said holder sidewalls extend downwardly below the plane of said holder body for substantially the entire length thereof.

13. The element of claim 10 wherein each of said holder and said end cap defines abutment means adapted to abut one another and limit relative movement in a given direction, thereby to limit the pressure exertable by said end cap on said holder body.

14. The element of claim 13 wherein said abutment means are on said sidewalls of said holder and said end cap.

15. A holder/end cap element for use in a storage package for a recording medium having a plurality of paperboard panels movable longitudinally between an open orientation enabling access to the contents of the package and a collapsed orientation for storage purposes and including a pair of end panels, said element comprising:
   (A) a holder formed of plastic and adapted to be disposed on one of the end panels of the plurality of panels for receiving and maintaining a recording medium thereon, said holder having a generally planar and generally rectangular body and a pair of opposed lateral sidewalls defining engaging means, said holder sidewalls extending downwardly below the plane of said holder body and, for the major length thereof, upwardly from the plane of said holder body, thereby to overlap and protect the sidewalls of any panels overlapped thereby; and
   (B) an end cap formed of plastic and having a longitudinal dimension substantially less than that of said holder so that said end cap can cover at most a minor portion of said holder, one end of said end cap being directly pivotally secured to one end of said holder, said end cap being generally U-shaped and having a pair of upstanding opposed lateral sidewalls and a connecting portion connecting the same, said end cap sidewalls defining engaging means adapted to engage cooperatively with said holder engaging means when the plurality of panels is in the collapsed orientation and to maintain the plurality of panels in said collapsed orientation, thereby to preclude accidental movement of the plurality of panels out of the collapsed orientation, said end cap extending upwardly and downwardly.

16. The element of claim 15 wherein each of said holder and said end cap defines abutment means on said sidewalls thereof adapted to abut one another and limit relative movement in a given direction, thereby to limit the pressure exerted by said end cap on said holder body.

* * * * *